(12) United States Patent
Kuchel et al.

(10) Patent No.: US 6,717,680 B1
(45) Date of Patent: Apr. 6, 2004

(54) APPARATUS AND METHOD FOR PHASE-SHIFTING INTERFEROMETRY

(76) Inventors: Michael Kuchel, Keplerstrasse 3, D-73447 Oberkochen (DE); Leslie L. Deck, 48 Valley Dr., Middletown, CT (US) 06457

( * ) Notice: Subject to any disclaimer, the term of this patent is extended or adjusted under 35 U.S.C. 154(b) by 142 days.

(21) Appl. No.: 10/144,527

(22) Filed: May 13, 2002

Related U.S. Application Data

(60) Provisional application No. 60/293,486, filed on May 25, 2001.

(51) Int. Cl.⁷ ................................................. G01B 9/02
(52) U.S. Cl. ...................................................... 356/514
(58) Field of Search ................................ 356/450, 480, 356/487, 495, 505, 506, 511, 512, 513, 514, 515, 519

(56) References Cited

U.S. PATENT DOCUMENTS

| | | | |
|---|---|---|---|
| 4,594,003 A | * | 6/1986 | Sommargren ................ 356/489 |
| 4,872,755 A | | 10/1989 | Kuchel |
| 5,398,112 A | * | 3/1995 | Ai et al. ...................... 356/514 |

OTHER PUBLICATIONS

Ch. 14 of "Optical Shop Testing," 2nd Ed., edited by D. Malacara, J. Wiley and Sons, New York, 1992.
de Groot, P., "Derivation of algorithms for phase–shifting interferometry using the concept of a data–sampling window," Appl. Opt. 34, 4723–4730 (1995).

Deck, L.; Multiple Surface Phase Shifting Interferometry, Proc. SPIE, 4451, 424–430 (2001).

Freischlad, K., "Large flat panel profiler," Proc. SPIE 2862, 163–171 (1996).

Freischlad, K., "Sensitivity of heterodyne shearing interferometers," Appl. Opt. 26, 4053–4054 (1987).

Hariharan, P. et al., "Digital phase–shifting interferometry: a simple error–compensating phase calculation algorithm," Apppl. Opt. 26, 2504–2506 (1987).

Schwider, J. et al., "Digital wavefront measuring interferometry: Some systematic error sources," Appl. Opt. 22, 3421–3432 (1983).

* cited by examiner

Primary Examiner—Samuel A. Turner
Assistant Examiner—Patrick Connolly
(74) Attorney, Agent, or Firm—Fish & Richardson P.C.

(57) ABSTRACT

The invention extends and improves the basic technique of phase-shifting interferometry by minimizing the measurement errors introduced by additional unwanted reflections from surfaces and surface defects far from the surface of interest. The inventive phase shifting interferometer includes at least two independent phase shifters. The two phase shifters operate cooperatively to produce a particular desired cavity interference modulation frequency while the modulation frequency of interference produced from other sources is significantly altered.

57 Claims, 7 Drawing Sheets

APPARATUS AND METHOD FOR PHASE-SHIFTING INTERFEROMETRY

CROSS-REFERENCE TO RELATED APPLICATIONS

This application claims priority from U.S. Provisional Application Ser. No. 60/293,486, entitled "APPARATUS AND METHOD FOR PHASE-SHIFTING INTERFEROMETRY," filed May 25, 2001, which is incorporated herein by reference in its entirety.

TECHNICAL FIELD

This invention relates to interferometry, and more particularly to multiple phase shifting interferometry.

BACKGROUND

Interferometric optical techniques are widely used to measure optical thickness, flatness, and other geometric and refractive index properties of precision optical components such as glass substrates used in lithographic photomasks.

For example, to measure the surface profile of a measurement surface, one can use an interferometer to combine a measurement wavefront reflected from the measurement surface with a reference wavefront reflected from a reference surface to form an optical interference pattern. Spatial variations in the intensity profile of the optical interference pattern correspond to phase differences between the combined measurement and reference wavefronts caused by variations in the profile of the measurement surface relative to the reference surface. Phase-shifting interferometry (PSI) can be used to accurately determine the phase differences and the corresponding profile of the measurement surface.

With PSI, the optical interference pattern is recorded for each of multiple phase-shifts between the reference and measurement wavefronts to produce a series of optical interference patterns that span a full cycle of optical interference (e.g., from constructive, to destructive, and back to constructive interference). In PSI, typically, a single phase shifting device is employed to shift the phase between the reference and measurement wavefronts to produce intensity modulation at a particular frequency.

The optical interference patterns define a series of intensity values for each spatial location of the pattern, wherein each series of intensity values has a sinusoidal dependence on the phase-shifts with a phase-offset equal to the phase difference between the combined measurement and reference wavefronts for that spatial location. Using numerical techniques known in the art, such as a Fourier decomposition of the intensity variation, the phase-offset for each spatial location is extracted from the sinusoidal dependence of the intensity values to provide a profile of the measurement surface relative the reference surface. Such numerical techniques are generally referred to as phase-shifting algorithms.

Unfortunately, PSI measurements can be complicated by spurious reflections from other surfaces of the measurement object because they too contribute to the optical interference. In particular, light from all locations in the interferometer, including scattering from small surface defects such as scratches, pits or dust (or volume defects such as bubbles) can influence the interferogram. These defects act as light scattering centers, producing characteristic ring patterns called Newton rings or "Bulls eye" patterns that can imprint onto the measured phase map, thereby affecting the extracted surface topography. In such cases, the net optical interference image is a superposition of multiple interference patterns produced by pairs of wavefronts reflected from the multiple surfaces or defects of the measurement object and the reference surface.

SUMMARY

In general, the multi-phase shifting interferometric system extends and improves phase-shifting interferometry by minimizing measurement errors resulting from additional, unwanted reflections of non-measurement surfaces and surface defects that contaminate the optical interference pattern. The multi-phase shifting interferometric system minimizes these measurement errors by exploiting the sensitivity of the PSI extracting algorithms to different modulation frequencies. In particular, each PSI extracting algorithms exhibits a specific frequency dependence whereby certain frequency components, determined by the exact algorithm, are weighted more heavily than other frequency components such that the algorithm suppresses certain frequency components relative to others. The multi-phase shifting interferometric system uses the frequency modulating sensitivity of the PSI extracting algorithms to filter and suppress the contribution of unwanted optical interference in the measured phase by interferometrically modulating the optical interference pattern resulting from additional, unwanted reflections of non-measurement surfaces and surface defects at frequencies that are different from the desired optical interference pattern and fall in frequency regions at which the algorithms exhibit low sensitivity.

The multi-phase shifting interferometric system includes at least two independent phase shifting components that each independently shift the phase in the interferometric cavity. Examples of phase shifting components include, but are not limited to, translatable measurement and reference surfaces, tunable light sources, polarizing optics, and phase shifting components in tandem interferometric systems. Together, the multiple-phase shifting components operate cooperatively to produce an interference modulation for the desired cavity interference at one frequency and an interference modulation due to the interference produced from other undesired sources at a different frequency. The multi-phase shifting interferometric system chooses phase shifting rates so that the undesired interference modulation occurs in frequency regions where the phase extraction algorithm exhibits reduced sensitivity and the desired interference modulation occurs in frequency regions of high algorithm sensitivity.

In general, in a first aspect the invention features a method for performing phase-shifting interferometry, which includes differentially modulating an interference signal derived from an interferometer to cause a first interference component of the interference signal to modulate at a first frequency and a second interference component of the interference signal to modulate at a second frequency, wherein the first interference component of the interference signal originates from an interferometric cavity of,interest in the interferometer and the second interference component of the interference signal originates from a defect in the interferometer.

Embodiments of the invention can further include any of the following features. The method can include differentially modulating the interference signal comprises independently shifting a phase in the interferometric cavity using at least two independent phase shifting components. The interferometric cavity can include a measurement object. The independent phase shifting can include using a first of the phase shifting components to modulate a position of a first surface (e.g., a reference surface or a measurement surface of a measurement object) that defines part of the interference cavity. The independent phase shifting can include using a second of the phase shifting components to modulate the position of a second surface that defines another part of the interference cavity. Moreover, the first surface can be a measurement surface and the second surface can be a reference surface. The desired interference intensity can modulate at a frequency related to:

$$v_1 - v_2$$

wherein $v_1$ and $v_2$ are the modulation rates of the first surface and the second surface, respectively.

Furthermore, in some embodiments the independent phase shifting can include using a first of the phase shifting components to modulate a wavelength of an input beam to the interferometer. In such cases, the interference signal phase variation due to the modulation of the wavelength can be related to $$2n\frac{\partial k}{\partial t}(x_1 - x_2)$$

wherein n is a refractive index, $$k = \frac{2\pi}{\lambda}$$

wherein $\lambda$ is the wavelength the input beam in the interferometer, $$\frac{\partial k}{\partial t}$$

is a wavelength scan rate, and $x_1$ and $x_2$ are positions of surfaces that define the interferometric cavity. The independent phase shifting further can include using a second of the phase shifting components to modulate $x_2$. The interference signal phase variation due to the wavelength modulation and the position modulation can be related to:

$$2n\frac{\partial k}{\partial t}(x_1 - x_2) - 2nkv_2$$

wherein $v_2$ is the rate at which $x_2$ is modulated. Moreover, the method can further include repositioning the surface at $x_1$ to a new position at $x_1'$, and selecting at least one of $x_1'$, $$\frac{\partial k}{\partial t}$$

or $v_2$ so that $$x_1' = x_1 + kv_2\left(\frac{\partial k}{\partial t}\right)^{-1}.$$

One of the surfaces can be a reference surface and the other of the surfaces can be a surface of a measurement object (e.g., a transparent measurement object). The distance between the measurement object and the reference surface can be at least equal to a thickness of the measurement object.

In further embodiments, the method can include any of the following features. The independent phase shifting can include using a first of the phase shifting components to variably sample a plane-polarized component of a polarized interference beam, wherein the interference signal is derived from the polarized interference beam, and the polarized interference beam is retarded by a predetermined amount prior to being variably sampled. The intensity of the normalized sampled component can be related to:

$$I(\theta, \varphi) = \frac{1 - \sin(2\theta - \varphi)}{2}$$

wherein $\theta$ is an orientation angle of the sampled component and $\varphi$ is a phase difference between a first component and a second component of the polarized interference signal, the first component being polarized orthogonal to the second component, and wherein the polarized interference beam is retarded by a quarter wavelength. The independent phase shifting can include using a second of the phase shifting components to modulate a wavelength of an input beam to the interferometer.

The method for performing phase-shifting interferometry can also include applying a phase extraction algorithm to the interference signal to determine a phase of the interference signal. A first sensitivity of the phase extraction algorithm occurring at the first frequency can be greater than a second sensitivity of the phase extraction algorithm occurring at the second frequency. Additionally, the method can include estimating, from a known geometry of the interferometer, a band of frequencies in which the second interference component could occur. Furthermore, the method can include selecting a first modulation rate of a first of the two independent phase shifting components and a second modulation rate of a second of the two independent phase shifting components, so that a first sensitivity of the phase extraction algorithm occurring at the first frequency is greater than a second sensitivity of the phase extraction algorithm occurring at a second frequency, the second frequency being within the estimated band of frequencies.

The phase-shifting interferometry method can include operating the interferometer in tandem with a second interferometer. The independent phase shifting can include using a first of the phase shifting components to modulate the position of a surface in the second interferometer. Furthermore, the independent phase shifting further can include using a second of the phase shifting components to modulate a wavelength of an input beam to the interferometer.

Furthermore, the interferometric cavity may include a reference surface and a surface of a measurement object. More specifically, a distance between the measurement object and the reference surface may be equal to at least a thickness of the measurement object (e.g., a transparent parallel plate).

The interferometer may be a Fizeau interferometer.

In general, in another aspect, the invention features a system for performing phase-shifting interferometry. The system includes: an interferometer for receiving a light beam to generate an interference signal; an interference cavity of interest included in the interferometer; a detector for recording the interference signal; at least two phase-shifting components for differentially modulating the interference signal; and a system controller connected to the at least two phase shifting components and the detector and which during operation causes the at least two phase-shifting components to modulate a first interference component of the interference signal at a first frequency and a second interference component to modulate at a second frequency, wherein the first interference component of in the interference signal originates from the interference cavity of interest and the second interference component if the interference signal originates from a defect in the interferometer.

Embodiments of the system can include any of the following features. The system can include a first surface that defines part of the interference cavity of interest, and wherein during operation a first of the phase shifting components modulates a position of the first surface. The first surface can be a reference surface or a measurement surface of a measurement object. The system can further include a second surface that defines another part of the interference cavity of interest, wherein during operation a second of the phase shifting components modulates the position of the second surface. The first surface can include a measurement surface and the second surface can include a reference surface.

Furthermore, the system can include a light source for providing a light beam to the interferometer, wherein the light beam has a wavelength, and during operation a first of the phase shifting components modulates the wavelength of the light beam from the light source. Additionally, the system can include a first surface defining a part of the interference cavity of interest, wherein during operation a second of the phase shifting components modulates a position of the first surface (e.g., a reference surface). The system can also include a second surface defining another part of the interference cavity of interest, wherein the first surface is a reference surface and the second surface is a measurement surface of a measurement object (e.g., a transparent measurement object). A distance between the measurement object and the reference surface may be at least equal to a thickness of the measurement object.

In some embodiments, the interferometry system can further include a polarizer positioned in the interferometer between the detector and the interference cavity of interest and a retarder (e.g., a quarter wave retarder) positioned in the interferometer between the polarizer and the interference cavity of interest; wherein the light beam is a polarized light beam and during operation a polarized interference beam is retarded by the retarder and a first of the phase shifting components rotates the polarizer to variably sample a plane-polarized component of the polarized interference beam, wherein the interference signal is derived from the polarized interference beam. Furthermore, the system can include a first surface (e.g., a reference surface) that defines part of the interference cavity of interest, and wherein during operation a second of the phase shifting components modulates a position of the first surface.

The interferometry system can include a second interferometer, the second interferometer positioned to operate in tandem with the interferometer. The second interferometer can include a surface, and during operation a first of the phase shifting components can modulate a position of the first surface. Furthermore, the system can include a light source for providing a light beam to the interferometers, wherein the light beam has a wavelength, and during operation a second of the phase shifting components modulates the wavelength of the light beam from the light source. The first and second interferometers can be any kind of interferometer, for example, a Fizeau interferometer and a Mach-Zehnder interferometer, respectively.

The interferometric cavity of interest in the interferometry system can include a reference surface and a surface of a measurement object (e.g., a transparent parallel plate). A distance between the measurement object and the reference surface can be equal to at least a thickness of the measurement object.

In general, the interferometer in the interferometry system can be any kind of interferometer (e.g., a Fizeau interferometer or a Michelson interferometer).

Embodiments of the invention can have one or more of the following advantages. The multi-interferometric system reduces the influence of coherent artifacts on phase measurements thereby improving the measurement accuracy and repeatability. The multi-interferometric system reduces optical constraints associated with measurements of transparent parallel plates. The multi-interferometric system provides a significantly increased working distance between the reference and transparent parallel plate test surfaces relative to wavelength tuning Fizeau interferometric systems, such as described in U.S. Ser. No. 09/349,593 filed on Jul. 7, 1999. In wavelength tuning Fizeau interferometric systems, thin transparent parallel plates must be positioned relative to the reference surface approximately one half the thickness of the plate so as to suppress correctly interference from the opposite surface, whereas the multi-interferometric system facilitates placement of the thin transparent parallel plate at a distance of several plate thicknesses.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

The invention features methods and systems for extending and improving phase-shifting interferometry by minimizing measurement errors resulting from additional, unwanted reflections of non-measurement surfaces and surface defects that contaminate the optical interference pattern. The multi-phase shifting interferometric (MPSI) system minimizes these measurement errors by exploiting the sensitivity of the PSI extracting algorithms to different modulation frequencies.

Figure 1:
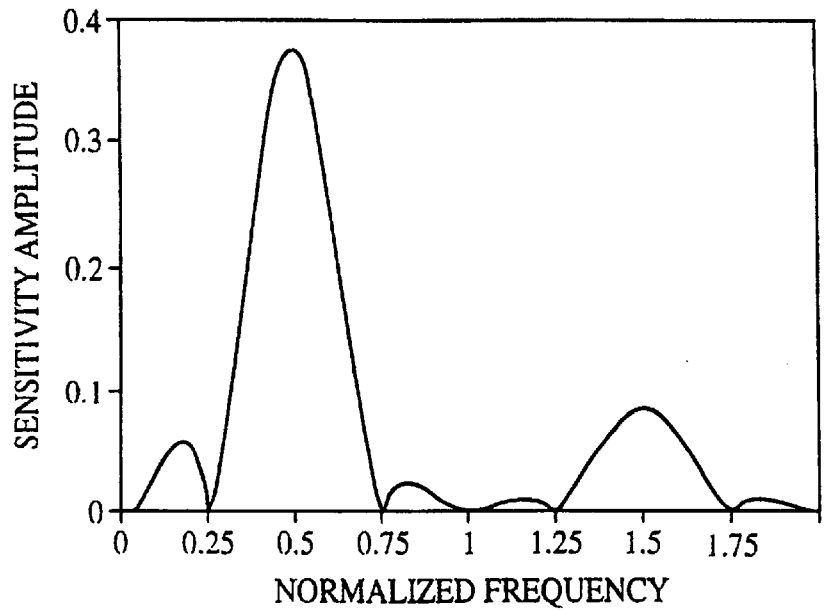
FIG. 1 is a graph of the relative sensitivity of a 5-frame phase extraction algorithm as a function of modulation frequency.
Figure 2:
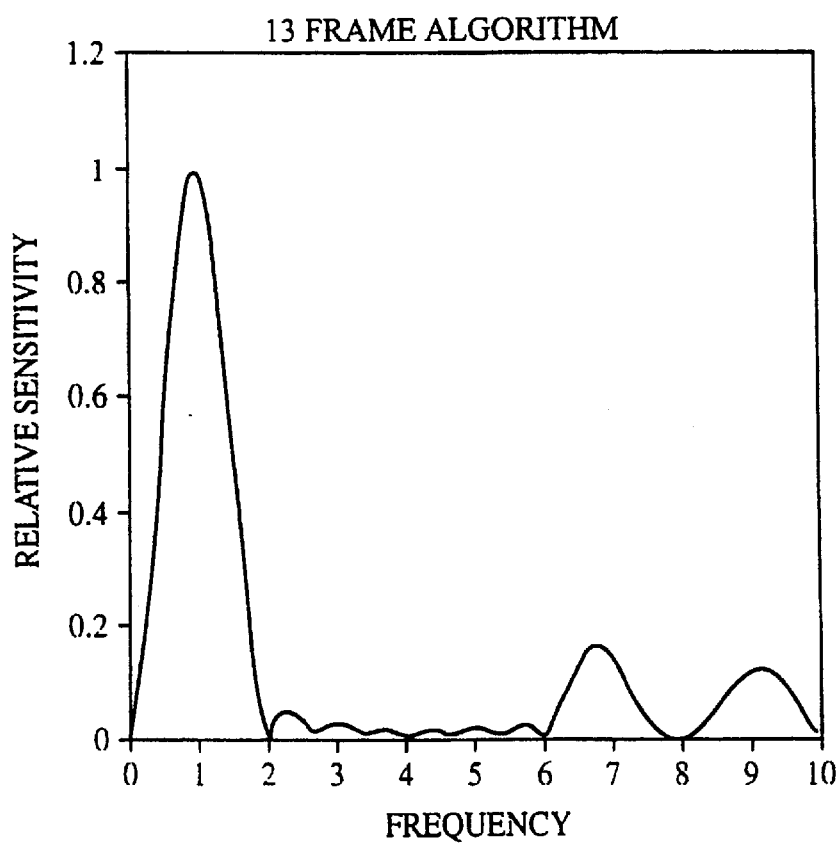
FIG. 2 is a graph of the relative sensitivity of a 13-frame phase extraction algorithm as a function of modulation frequency.

Referring to FIG. 1, a plot exhibits regions of varying sensitivity of a 5-frame phase extraction algorithm, the Schwider-Hariharan 5-frame algorithm, as a function of normalized modulation frequency. In this example, the sensitivity reaches a maximum at a normalized frequency of 0.5 and several minima at normalized frequencies of 0.25, 1, 1.25, 1.75 and 2. The exact location of the sensitivity maxima and minima depends upon the exact phase extraction algorithm. Compare, for example, the 5-frame phase extraction algorithm of FIG. 1 with the 13-frame phase extraction algorithm shown in FIG. 2. The 13-frame phase extraction algorithm exhibits maximum sensitivity at a normalized frequency of 1, and secondary sensitivity maxima at 7 and 9. Minima are at normalized frequencies of 2, 4, 6, 8, and 10.

Knowing the sensitivity response of the PSI extracting algorithm, the MPSI system modulates the optical interference pattern such that the undesired and desired interference patterns modulate at different frequencies. The MPSI system causes the undesired interference patterns to modulate within frequency regions at which the PSI extracting algorithm exhibits less sensitivity relative to the frequency region at which the MPSI system modulates the desired interference patterns. The MPSI system produces differential modulating frequencies for the desired and undesired interferometric patterns by utilizing more than one phase-shifting component.

The multi-phase shifting interferometric system includes at least two independent phase-shifting components, such as translatable measurement and reference surfaces, tunable light sources, polarizing optics, and tandem interferometric systems, each of which independently can generate a phase shift in the interference from the interferometric cavity. Together, the multiple-phase shifting components operate cooperatively to produce an interference modulation for the desired cavity interference pattern at one frequency and an interference modulation for the interference pattern produced from other undesired sources at a different frequency. The MPSI system chooses the rate at which each phase shifting component changes the phase so that the undesired interference pattern modulates at a frequency where the phase extraction algorithm exhibits reduced sensitivity and the desired interference pattern modulates at a frequency where the phase extraction algorithm exhibits of higher sensitivity.

In general, the MPSI system modulates the desired interference pattern at frequencies occurring at or near the maximum algorithm sensitivity. For example, given the 5-frame phase extraction algorithm, the system can modulate the undesired interference at 1.25 normalized frequency units while modulating the desired interference at 0.5 normalized frequency units. When extracting the phase, the 5-frame phase extraction algorithm effectively rejects the contribution of the undesired interference pattern. Of course, the ratio of algorithm's sensitivity between the desired and undesired interference patterns, $S_{Desired}:S_{Undesired}$, need not be infinity (any value:zero). Rather, the MPSI system operator can preset the ratio to a desired level, such as 10:1. The MPSI system, in turn, will fix the frequency for modulating the desired interference pattern at or near the algorithm's maximum and then determine the modulating frequencies that exhibit a sensitivity to satisfy the relationship $S_{Desired}:S_{Undesired}$. One embodiment of the invention is an MPSI system including two mechanical phase-shifting components, e.g., translatable measurement and reference surfaces of the interferometric cavity.

Figure 3:
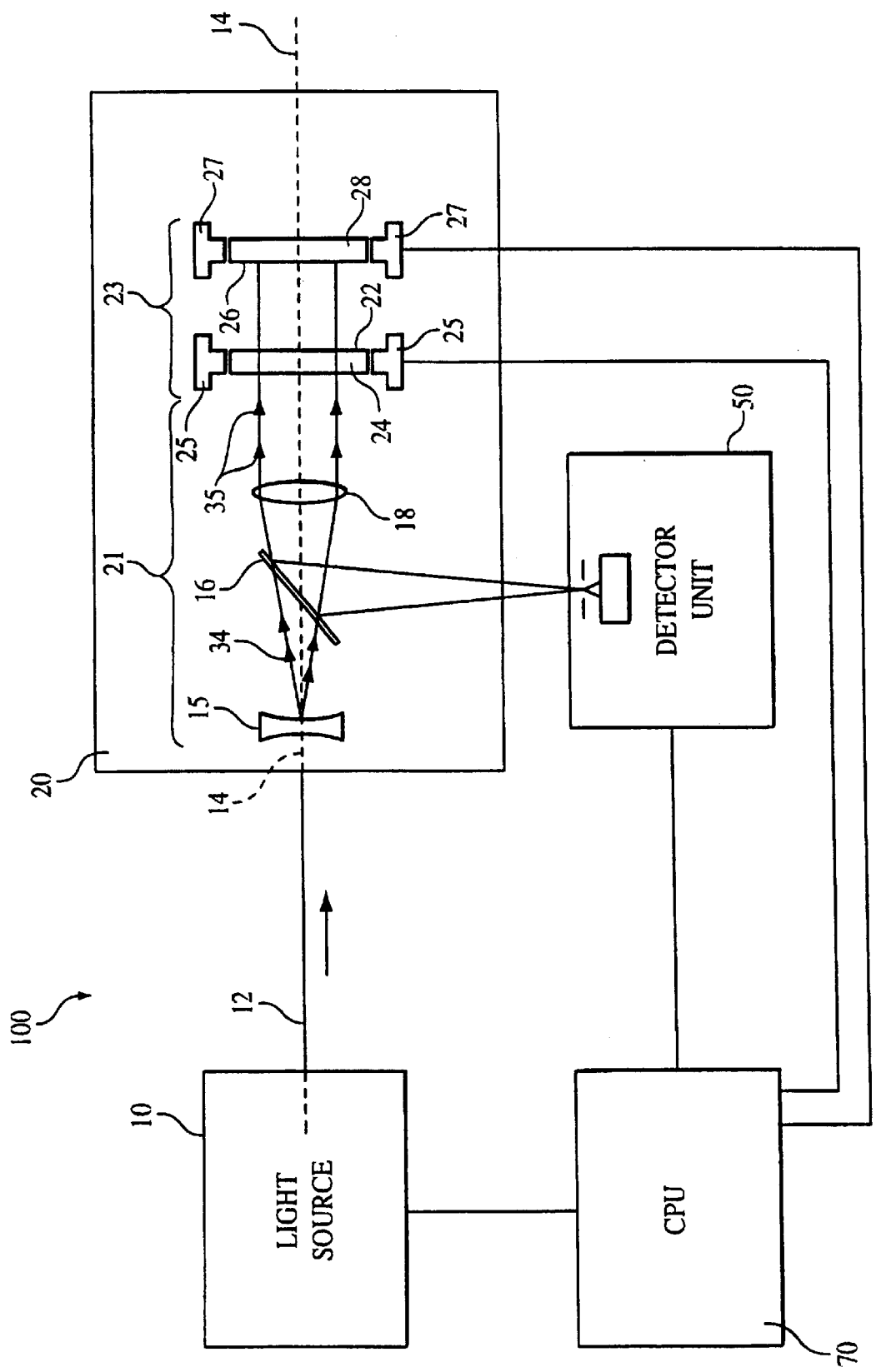
FIG. 3 is a schematic diagram of a multi-phase shifting apparatus.

Referring to FIG. 3, a MPSI apparatus 100 includes a light source 10, a detector unit 50, a central processing unit (CPU) 70, and an interferometer unit 20. Light source 10, a VORTEX™ series external cavity diode laser available from New Focus, produces a nearly collimated and monochromatic beam 12 of coherent optical energy that propagates into interferometer unit 20 along optical path 14. Interferometer unit 20 includes, in sequential order along the propagating direction of beam 12 (arrow), beam wavefront optics 21 and a Fizeau-type cavity 23 formed between a surface 22 of a reference object 24 and a surface 26 of test object 28. Reference object 24 and test object 28 are secured in separate translatable mounts 25 and 27, respectively, each of which are independently translatable in a direction parallel to optical path 14. Beam wavefront optics 21 includes a diverging lens 15, a beamsplitter 16, and a collimating lens 18. Diverging lens 14 converts beam 12 into a diverging wavefront 34 which passes through beamsplitter 16 and collimating lens 18. Collimating lens 18 collimates diverging wavefront 34 to produce a plano wavefront 35. For ease of viewing, only a single ray of wavefront 35 is shown. Plano wavefront 35 propagates into interferometer cavity 23.

Figure 4:
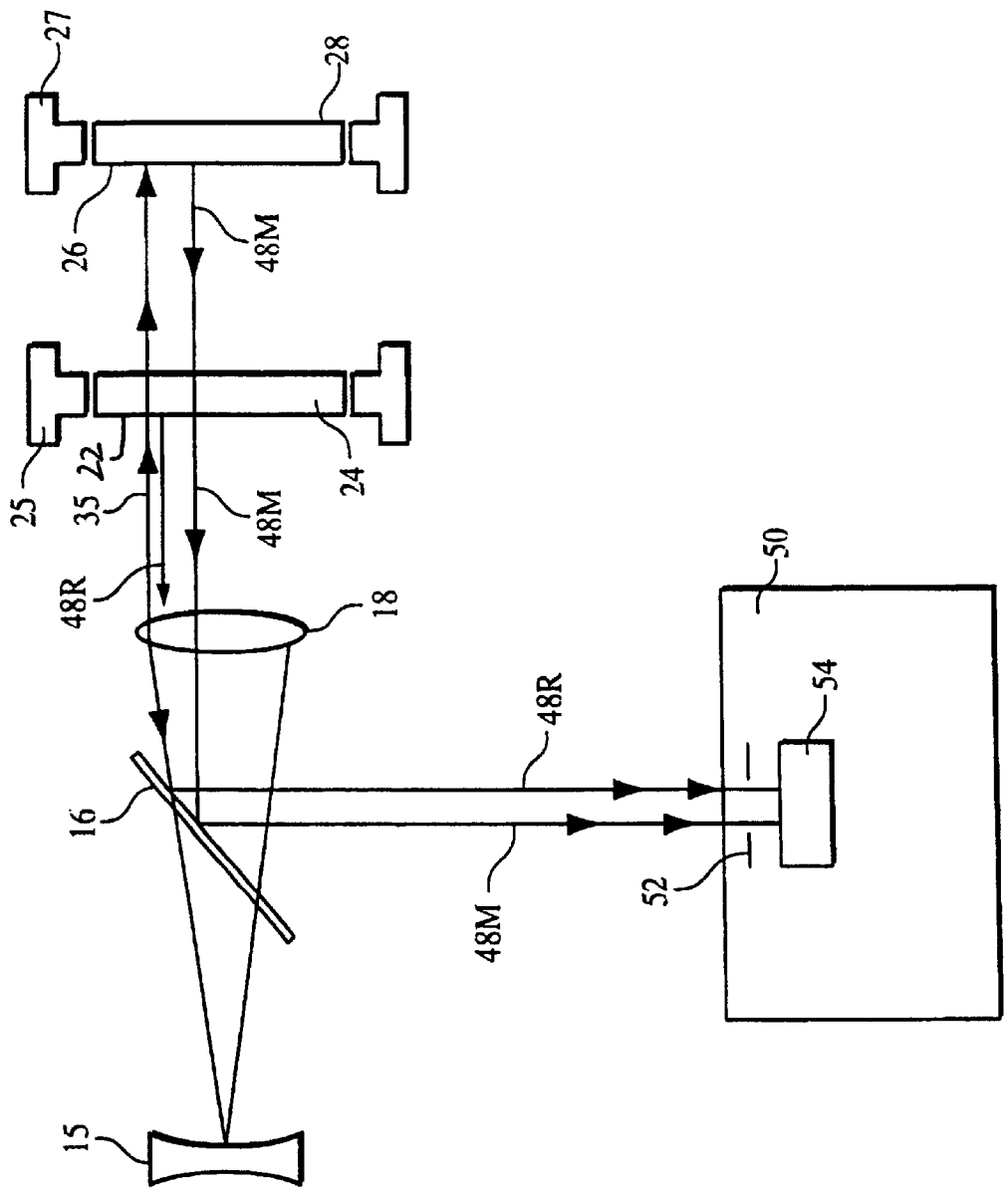
FIG. 4 is an expanded schematic view of the interferometer unit and detector unit of the multi-phase shifting apparatus shown in FIG. 3.

Referring to FIG. 4, as plano wavefront 35 impinges on reference object 24, a portion of the wavefront reflects off surface 22 as reference wavefront 48R. The remaining portion of wavefront 35 propagates through reference object 24 towards surface 26 of test object 28 which, in turn, reflects a portion of wavefront 35 as a measurement wavefront 48M back towards reference object 24. Measurement wavefront 48M propagates through the reference object towards collimating lens 18. Collimating lens 18 collects and focuses both reference wavefront 48R and measurement wavefront 48M back towards beamsplitter 16 which, in turn, reflects a portion of each wavefront 48M and 48R into detector unit 50. Detector unit 50 includes a spatial filter 52 and a sensor 54. Spatial filter 52, positioned near the focal length of collimating lens 18 blocks non-paraxial wavefronts from propagating onto sensor 54. Sensor 54 records a signal resulting from the interference of wavefronts 48M and 48R. The amplitudes of wavefronts 48 M and 48R are denoted as $$A_T = a_T e^{2inkx_T} \text{ and } A_R = a_R e^{2inkx_R}$$

respectively, where the subscript T refers to the test object, the subscript R refers to the reference object, $$k = \frac{2\pi}{\lambda}$$

n is the refractive index, x represents a surface position, and $a_{T,R}$ are real coefficients proportional to the square root of the intensity reflectivity of the test and object surfaces. To first order, the interference intensity from wavefronts 48 M and 48R is the square of the sum of these two amplitudes expressed as $$|A_T + A_R|^2 = |a_T e^{2inkx_T} + a_R e^{2inkx_R}|^2 = a_T^2 + a_R^2 + 2a_T a_R \cos(2nk(x_T - x_R)) \quad (1)$$

During conventional phase-shifting, CPU 70 (FIG. 3) sends an electronic signal to either translatable mounts 25 or 27 causing that mount to translate the test or the reference object at a specific rate, v. Translating either the object or reference surface causes the phase between wavefronts 48M and 48R to shift at a specific rate which, in turn, causes the interference intensity to modulate at a particular frequency given by $fc = 2nv/\lambda$.

Figure 5:
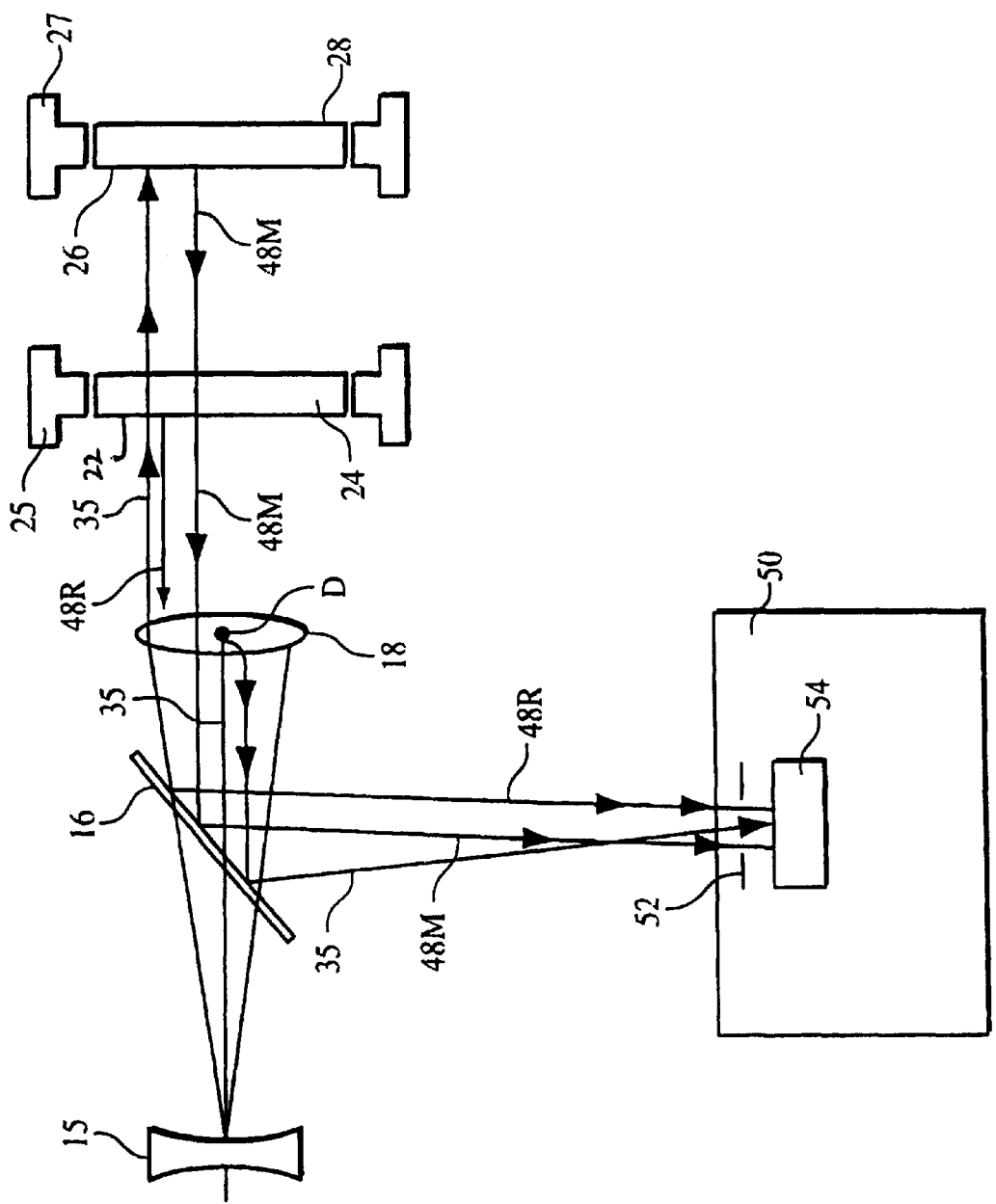
FIG. 5 is a schematic diagram of the multi-phase shifting apparatus of FIG. 3 including defects in the interferometer optics.

Referring now to FIG. 5, a point defect, D, located in the beam wavefront optics will generate backscatter of plano wavefront 35 having an amplitude, $A_D$, which will interfere with either $A_R$ or $A_T$ depending upon which object the CPU translates. If the CPU shifts the reference object, the interference signal will modulate at $|A_D + A_R|^2$ and if the CPU shifts the test object, the interference signal will modulate at $|A_D+A_T|^2$. In either case, defects in interferometer 20 modulate the intensity signal on sensor 54 at the same frequency, fc, as $|A_R+A_T|^2$. Thus, the defects produce errors in the phase-shifting interferometric measurements because the phase extraction algorithms have difficulty differentiating $|A_R+A_T|^2$ from either $|A_D+A_R|^2$ or $|A_D+A_T|^2$ when extracting the phase from the interference signal since both interferences modulate as the same frequency.

In general, phase extraction algorithms used in phase-shifting interferometric measurements show a strong sensitivity to the different modulation frequencies, with the greatest sensitivity occurring at a particular frequency corresponding to the fringe carrier frequency. Typically, these phase extraction algorithms are derived by assuming a particular shape for a window function such as a Fourier Window Function. See, for example, "Derivation of algorithms for phase-shifting interferometry using the concept of a data sampling window," in Appl. Opt. 34, 4723–4730 (1995), by P. de Groot. Different shaped window functions alter the sensitivity of the algorithm to different modulating frequencies. Thus, each algorithm exhibits a different frequency sensitivity or frequency response. Several phase-shifting algorithms are discussed by J. Schwider et. al. in "Digital wavefront measuring interferometry: some systematic error sources," published in Appl. Opt. 22, 3421–3432 (1983), by P. Hariharan et. al. in "Digital phase-shifting interferometry: a simple error-compensating phase calculation algorithm," published by Appl. Opt. 26, 2504–2506 (1987), in *Optical Shop Testing* ($2^{nd}$ Ed.), Chapter 14, p. 501 (Wiley, N.Y., 1992), and by Y. Surrel in "Design of algorithms for phase measurements by the use of phase stepping," Appl. Opt. 35, 51–60 (1996). The frequency sensitivity for phase extracting algorithms as a function of frequency can be determined by numerical simulation or analytical calculation.

Referring back to FIG. 3, MPSI apparatus 100, reduces the magnitude by which intensity modulation from defects effects the phase extraction by translating both the reference object and the test object at different rates. The interference intensity from wavefronts 48 M and 48R, the square of the sum of the two wavefront amplitudes, is expressed as $$a_T^2 + a_R^2 + 2a_T a_R \cos(2nkt(v_T - v_R)) \quad (2)$$

where $v_R$ is the rate at which mount 25 shifts the reference object, and $v_T$ is the rate at which mount 27 shifts the test object. As a result of moving both objects at different rates in the interferometer, the interference signal resulting from the interference of wavefronts 48 M and 48R modulates at a frequency proportional to the difference of the two shifting rates, $$\frac{2n(v_R - v_T)}{\lambda},$$

whereas the interference from the defect with either the reference or test wavefronts will modulate at the defect frequencies, $$\frac{2nv_R}{\lambda} \text{ and } \frac{2nv_T}{\lambda}.$$

Based upon the sensitivity response of the phase extraction algorithm as a function of frequency chosen by the system operator, CPU 70 determines which shifting rates, $v_R$ and $v_T$, will minimize the sensitivity of the algorithm to interference modulations at the defect frequencies but maintain high frequency sensitivity at the desired frequencies. CPU 70 determines the shifting rates either by selecting rates which result in the desired interference intensity occurring at the algorithm's highest frequency sensitivity and defect interference intensity occurring at the algorithm's least sensitive frequencies or by selecting rates which cause the desired and defect interference intensities to occur at sensitivity thresholds set by the system operator. For example in the five-frame algorithm (FIG. 1), CPU 70 can select scan rates $v_R$ and $v_T$ such that $$\frac{2nv_R}{\lambda}$$

falls at 1.25 normalized frequency units and $$\frac{2nv_T}{\lambda}$$

falls at 0.75 normalized frequency units. In this scenario, the modulating frequency resulting from the interference of wavefronts 48 M and 48R occurs at the most sensitive normalized frequency, 0.5, whereas the modulating interference at the defect frequencies, 1.25 and 0.75, occurs at the algorithm's least sensitive frequencies. In general, the shifting rates are physically limited by the components of the interferometer cavity, such as the size and weight of the test object and reference object, and the shifting rates obtainable by the translatable mounts.

Figure 6:
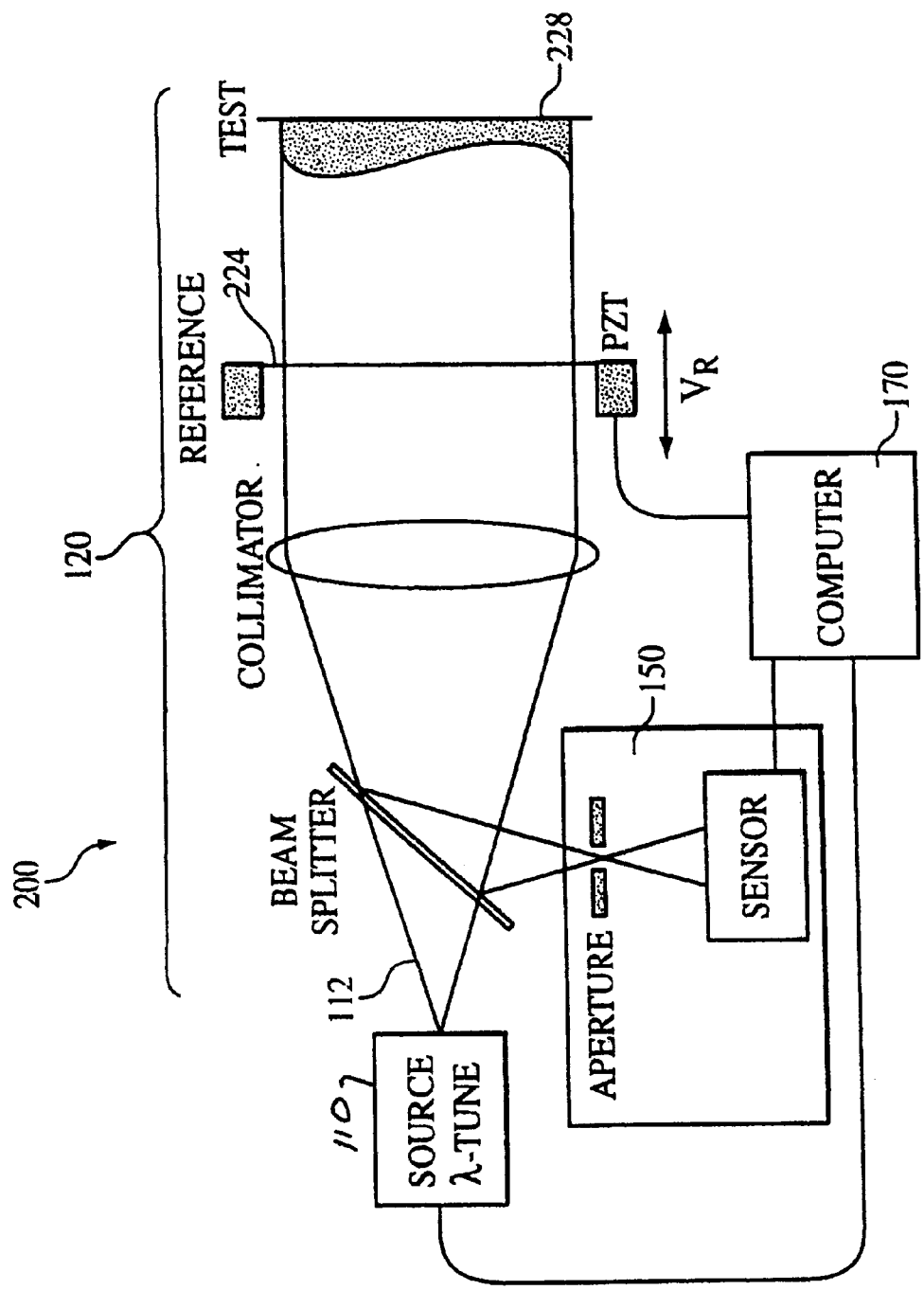
FIG. 6 is a schematic of another multi-phase shifting apparatus.

In another embodiment the MPSI system includes one mechanical phase-shifting component and an optical phase-shifting component, e.g., translatable measurement or reference surface and a tunable light source. Referring to FIG. 6, a MPSI apparatus 200 reduces defect modulating intensity in the interference signal by concurrently scanning either reference object 224 or test object 228 and tuning the wavelength at which a tunable light source 110 emits a monochromatic beam 112 of coherent optical energy. Each of detector unit 150, central processing unit (CPU) 170, and interferometer unit 120 are similar to those units described above. Phase-shifting interferometers employing only wavelength tuning are described for example by G. Sommargren in U.S. Pat. No. 4,594,003, the contents of which are hereby incorporated in its entirety.

When scanning the wavelength of beam 112, the interference intensity signal sensed by detector unit 150 has a phase, $\phi$, expressed as $$\phi = 2nk(x_T - x_R) \quad (3)$$

where $x_T$ is the measurement object position and $x_R$ represents the reference object position, and n and k are as defined for Eq. 1. The phase varies as in time as $$\frac{\partial \varphi}{\partial t} = 2n\frac{\partial k}{\partial t}(x_T - x_R) \quad (4)$$

Thus, the interference signal modulates at a frequency proportional to the optical path difference, $(x_T - x_R)$, such that any interfering wavefronts separated by that distance contribute to the interference signal at that the same frequency. For example, referring back to FIG. 5, defect, D, located in the beam wavefront optics will generate a backscatter wavefront 35 which will interfere with any other wavefront reflected or backscattered at a distance $(x_T - x_R)$ away from D. To remove unwanted interference at those distances, CPU 170 sends a signal to the translatable mount holding the reference object causing it to shift at a rate, $v_R$. The phase variation of the interference signal now is given by the expression $$\frac{\partial \varphi'}{\partial t} = 2n\frac{\partial k}{\partial t}(x'_T - x'_R) - 2nkv_R, \quad (5)$$

where the first term describes the effect of scanning the wavelength and the second term describes the effect of scanning the reference object. To recover the desired phase variation caused by the interferometric cavity described in Eq. 4, the CPU changes either the wavelength scan rate $$\frac{\partial k}{\partial t},$$

the reference object shifting rate, or the position of the test object, for a given rate, $v_R$, such that $$x'_T = x_T + kv_R\left(\frac{\partial k}{\partial t}\right)^{-1} \quad (6)$$

In general, the CPU, as described below, determines the wavelength scan rate and the reference object shift rate and repositions the measurement object at a distance that satisfies Eq. 6. Without knowing, a priori, precisely where the defects, D, are located within the interferometer of MPSI apparatus 200, the CPU can estimate a band of frequencies in which defect interference could occur by using the known interferometer geometry, e.g., distances between optical components, to calculate a range of path differences capable of producing defect interference. CPU 170, in turn, uses the sensitivity response of the phase extracting algorithm along with Eqs. 4–6 and the predicted frequency band of potential defect interference to determine wavelength scanning rates and reference object scanning rates that cause the desired interference pattern between the measurement and reference objects to occur at high algorithm sensitivity and undesired, defect interference in regions of lower algorithm sensitivity.

Advantageously, Eq. 6 allows MPSI apparatus 200 to provide an increased interferometric cavity length between reference objects and thin, transparent parallel measurement objects relative to those cavity lengths required in prior wavelength-tuning interferometry, such as described in U.S. Ser. No. 09/349,593 filed on Jul. 7, 1999. In wavelength-tuning interferometry without reference object shifting, the thin, transparent parallel measurement object, typically, must be placed next to the reference object at a distance less than the thickness of the measurement object. For a set wavelength tuning rate and reference shift rate, Eq. 6 requires that the thin, transparent parallel measurement object be placed further away from the reference object. Of course, the exact increase in interferometric cavity length depends upon the exact wavelength tuning rate and reference shift rate.

To elaborate on this point consider, for example, characterizing a parallel plate having a thickness, T, of 7 millimeters and an index n=1.5. According to the method disclosed in U.S. Ser. No. 09/349,593 the gap between a reference surface and a test surface of the parallel plate should ideally be about half the thickness of the measurement object, or about 3.5 millimeters in this case. Using the 13 bucket algorithm the phase separation between frames is $\pi/4$, so the fundamental frequency, f, normalized to the frame rate is 0.125, where the normalized frequency corresponding to a $2\pi$ phase shift. Taking the position of the reference surface, $x_R$, to be at 0 millimeters, then the position of the test surface, $x_T$, is at 3.5 millimeters and the second surface of the parallel plate is at $x_2$=10.5 millimeters. The optical frequency shift per frame, $\Delta v$, is thus $$\Delta v = \frac{v}{8(x_T - x_R)} = 5.357 \text{ GHz}. \quad (7)$$

Here, c is the velocity of light in a vacuum (i.e., $3\times10^8$ ms$^{-1}$). For 13 frames, the acquisition shifts the optical frequency a total of 70 GHz, a total shift that is within the range of currently available sources (e.g., VORTEX™ series external cavity diode laser available from New Focus). The normalized frequency from interference from the second surface at $x_2$ and the reference surface at $x_R$ is $$f_2 = \frac{2}{c}\Delta v\left(\frac{T}{2} + nT\right) = 0.5$$

and the internal Fizeau frequency is $$f_F = \frac{2}{c}nT\Delta v = 0.375.$$

Both $f_2$ and $f_F$ are well away from the fundamental frequency f, where $$f = \frac{2}{c}\frac{T}{2}\Delta v = 0.125.$$

Use of MPSI eases the constraint of accurately positioning of the measurement surface at $x_T$=T/2, without comprising the frequencies f, $f_2$, and $f_F$. For example, consider positioning $x_T$ at 25 millimeters in the same system. Then, from Eq. 6, the reference position change per frame, $v_R$, is given by $$v_R = (x'_T - x_T)\frac{1}{k}\frac{\partial k}{\partial t} = (x'_T - x_T)\frac{\lambda}{c}\Delta v = 243 \text{ nm/frame}, \quad (8)$$

which corresponds to about 14.6 microns/second for a 60 Hz camera and $\lambda$=633 nm. Selecting this reference object shifting rate yields the fundamental frequency $$f = \frac{2\Delta v}{c}x'_T - \frac{2v_R}{\lambda} = 0.125, \quad (9)$$

which is unchanged from the originally selected value positioned at a sensitivity maximum of the phase extraction algorithm. The interference frequencies $f_2$(at 0.5) and $f_F$(at 0.375) are similarly unchanged, remaining well away from the fundamental frequency, f.

Figure 7:
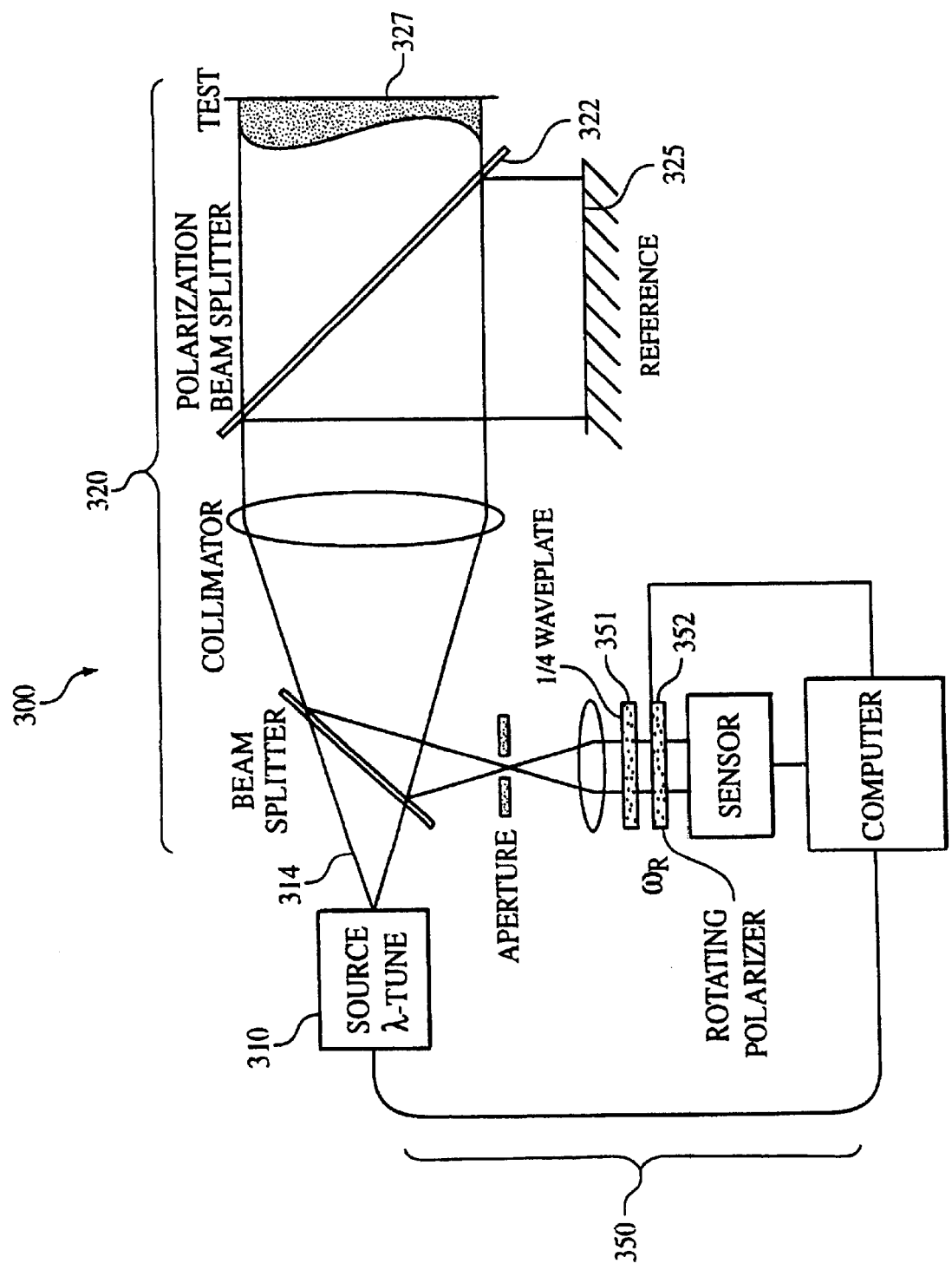
FIG. 7 is a schematic of another multi-phase shifting apparatus.

Referring to FIG. 7, in another embodiment, a MPSI apparatus 300 includes an interferometer unit 320, employing a Michelson geometry, a tunable polarized light source 310, and detector unit 350 including a ¼ waveplate 351 and a rotating polarizer 352. Light source 310, such as a frequency stabilized laser, generates a polarized optical beam 314 including horizontally and vertically polarized components. Interferometer unit 320 includes a polarization beamsplitter 322 which reflects a specific polarization of light beam 314, such as horizontally polarized light, towards reference object 325 and transmits a polarization perpendicular to that reflected by polarization beamsplitter 322 towards measurement object 327. Polarized light reflecting off of the surfaces of reference object 325 and measurement object 327 recombine into a polarized interference beam at polarization beamsplitter 322. This beam is imaged onto detector unit 350. ¼ waveplate 351 oriented at 45° with respect to the vertically polarized light components and rotating polarizer 352 respectively introduce a known retardation and sample a component of the interference beam prior to detection. The intensity of light measured at the detector is then a function of the interference phase, $\phi$, and angle of the transmission axis of polarizer 352, $\theta$, as measured from the vertical direction (i.e., the component of the interference beam sampled by the poalrizer). This intensity dependence can be determined through a Jones matrix analysis. The intensity is given by:

$$I(\theta,\phi) = |R(-\theta) \cdot POL \cdot R(\theta) \cdot R(-\pi/4) \cdot QWP \cdot R(\pi/4) \cdot P(\phi)|^2 \quad (10)$$

which produces the functional dependence $$I(\theta, \varphi) = \frac{1}{2} - \frac{1}{2}\sin(2\theta + \varphi). \quad (11)$$

Here, the matrix for the beam representing the two returning polarizations is:

$$P(\varphi) = \frac{1}{\sqrt{2}}\begin{bmatrix} e^{i\varphi} \\ 1 \end{bmatrix}, \quad (12)$$

where $\phi$ is the phase difference between the two orthogonal polarizations. The field amplitudes for both polarization states are assumed to be unity for convenience. The ¼ wave plate, assumed perfect, with the fast axis horizontal is expressed as:

$$QWP = \begin{bmatrix} e^{i\frac{\pi}{4}} & 0 \\ 0 & e^{-i\frac{\pi}{4}} \end{bmatrix}, \quad (13)$$

and the linear polarizer, also assumed perfect, with the transmission axis vertical is expressed as:

$$POL = \begin{bmatrix} 1 & 0 \\ 0 & 0 \end{bmatrix}. \quad (14)$$

Rotation of the transmission axis of the polarizer through $\theta$ is expressed through a rotation matrix:

$$R(\theta) = \begin{bmatrix} \cos(\theta) & -\sin(\theta) \\ \sin(\theta) & \cos(\theta) \end{bmatrix}. \quad (15)$$

From Eq. 11 it is evident that rotating the polarizer through one full rotation ($2\pi$) cycles the interference intensity at the detector through two cycles (from the $2\theta$ dependence), and $\phi$ contributes a phase shift to the sinusoid. Hence, rotating the polarizer at a predetermined rate introduces a corresponding modulation in the detected interference signal, the modulation having a frequency that is proportional to the polarizer rotation rate.

By scanning the wavelength at a specific rate, $$\frac{\partial k}{\partial t},$$

and rotating the polarizer at a rate, $$\frac{\partial \theta}{\partial t},$$

MPSI apparatus 300 modulates the desired interference at a frequency corresponding to high algorithm sensitivity and the undesired interference at a frequency corresponding to low algorithm sensitivity. For a given interferometric cavity length, the optical path difference between the measurement and reference object, the CPU determines the desired rates of scanning and rotation by analyzing equations analogous to Eqs. 4–6.

Figure 8:
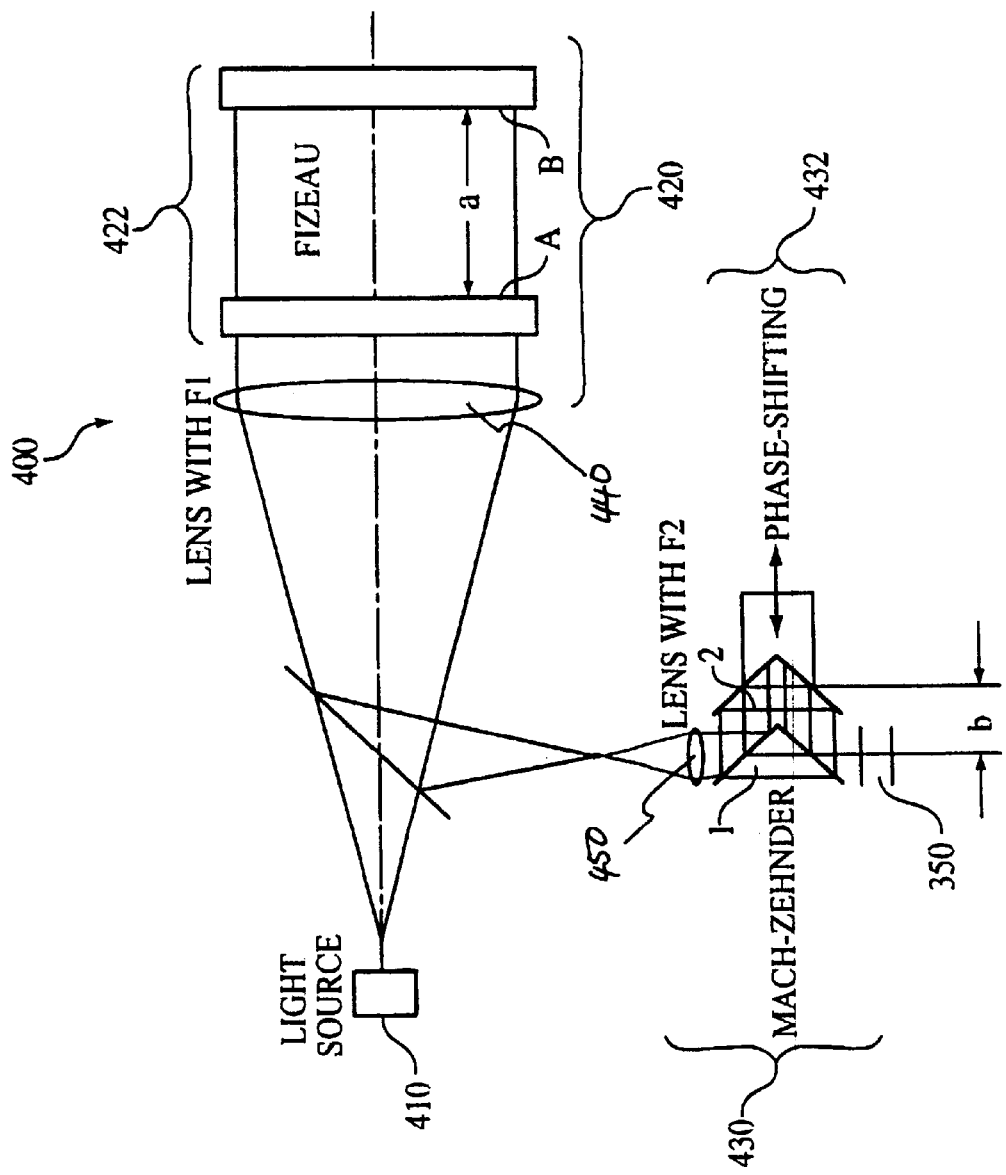
FIG. 8 is a schematic of another multi-phase shifting apparatus.

A number of embodiments of the invention have been described. Nevertheless, it will be understood that various modifications can be made without departing from the spirit and scope of the invention. For example, the MPSI apparatus can include a plurality of interferometric cavities, operating in tandem. Referring to FIG. 8, a MPSI apparatus 400 includes a measuring interferometer unit 420, including a Fizeau cavity 422, a modulating interferometer unit 430, including a Mach-Zehnder 432, a tunable light source 410, and detector unit 450. Also included are collimating lenses 440 and 450. Lens 440 has a focal length $f_1$, and lens 450 has a focal length $f_2$. In this arrangement, there are four primary possibilities for light traveling from light source 410 to detector unit 450: (i) reflecting off surface A of the transmission flat in the Fizeau cavity and via the short path of the Mach-Zehnder, for a total path length of $s_0$; (ii) reflecting off surface A of the transmission flat in the Fizeau cavity and via the long path of the Mach-Zehnder, for a total path length of $s_1 = s_0 + 2b$; (iii) reflecting off surface B of the test piece in the Fizeau cavity and via the short path of the Mach-Zehnder, for a total path length of $s_2 = s_0 + 2a$; and, (iv) reflecting off surface B of the test piece in the Fizeau cavity and via the long path of the Mach-Zehnder, for a total path length of $s_3 = s_0 + 2a + 2b$.

Light propagating along any two of these paths will interfere with a phase proportional to the difference between the path lengths. There are six possible path length differences, given by:

| | |
|---|---|
| path (i) with path (ii)→$s_1 - s_0 = 2b$ | I. |
| path (i) with path (iii)→$s_2 - s_0 = 2a$ | II. |
| path (i) with path (iv)→$s_3 - s_0 = 2(a+b)$ | III. |
| path (ii) with path (iii)→$s_2 - s_1 = 2(a-b)$ | IV. |
| path (ii) with path (iv)→$s_3 - s_1 = 2a$ | V. |
| path (iii) with path (iv)→$s_3 - s_2 = 2b$ | VI. |

The path length differences I and VI lead to the same value, 2b. Similarly, path length differences II and V lead to the value, 2a. To avoid these ambiguities, either path length difference III or path length difference IV is chosen. From the standpoint of properly imaging surfaces A and B on the detector at the same time, path length difference IV is often preferred. The imaging condition can be fulfilled for both surfaces at the same time if the relation $$b = a\left(\frac{f_2}{f_1}\right)^2 \qquad (16)$$

is met. In this case, the second phase shifting component (e.g., the tunable light source) must be synchronized with the path length difference given by $$s_2 - s_1 = 2a\left(1 - \left(\frac{f_2}{f_1}\right)^2\right). \qquad (17)$$

As both surfaces are imaged to the detector, it is possible to use an extended source (e.g., moving ground glass as a spatially incoherent source with speckle smoothed out by averaging) for illumination of the interferometer, with reduced degradation of contrast. This can be useful for the suppression of unwanted noise.

In some cases, the quantity $$b = a\left(\frac{f_2}{f_1}\right)^2$$

might be too small for most practical purposes, especially where a is kept small to minimize the amount of air in the Fizeau cavity. In this case it is possible to include additional optics, such as a system of telescoping lenses, after the Mach-Zehnder interferometer, in order to fit the beam diameter onto the detector area.

MPSI apparatus 400 suppresses undesired interference relative to desired interference by utilizing two phase-shifting components, such as the Mach-Zehnder and tunable light source or the Mach-Zehnder and the Fizeau cavity. Examples of apparatuses including a plurality of interferometric cavities can be found for example in U.S. Pat. No. 4,872,755, the contents of which are incorporated herein by reference.

MPSI apparatuses including a plurality of interferometric cavities can be used to avoid mechanical phase-shifting components of the interferometric cavity including the measurement object, and thereby increase the stability of the apparatus. Although the embodiment in FIG. 8 is shown with a specific geometry, the plurality of interferometric cavities can be arranged relative to each other in any geometry that facilitates differential frequency modulation of desired and undesired interference intensities.

Although certain combinations of phase-shifting are detailed in the apparatuses described above, other embodiments can employ any combination of phase-shifting components to modulate the undesired interference intensity at a frequency different than the frequency at which the desired interference intensity modulates. For example, the apparatus can include more than two phase-shifting components. Each interferometric cavity can be formed in any interferometer geometry, including, but not limited to, Fizeau, Mach-Zehnder, and Michelson.

The light source for the MSPI apparatuses can be a laser such as a gas, solid-state, tunable dye or semiconductor laser. The light source can also be a white-light source with a tunable narrow-band spectral filter. The total range and interval of a wavelength tunable light source depends on the particular phase-extracting algorithm. The thirteen-frame algorithm, for example, requires that the CPU collect images at thirteen wavelengths at intervals of a $\pi/4$ phase shift. Other phase extracting algorithms, such as the five-frame algorithm require that the CPU record images at $\pi/2$ phase shifts.

The rate of tuning the wavelength of the light source and scanning an interferometric cavity can be limited. In those embodiments, the CPU takes into account the upper and lower scanning rates when determining which rates are needed to differentially modulate the interference intensity such that desired interference intensity modulate in frequency regions at which the phase extracting algorithm exhibits high sensitivity and the undesired interference intensity modulates in frequency regions of low-algorithm sensitivity.

Other aspects, advantages, and modifications are within the scope of the following claims.

What is claimed is:

1. A method for performing phase-shifting interferometry, the method comprising:

differentially modulating an interference signal derived from an interferometer to cause a first interference component of the interference signal to modulate at a first frequency and a second interference component of the interference signal to modulate at a second frequency, wherein the first interference component of the interference signal originates from an interferometric cavity of interest in the interferometer and the second interference component of the interference signal originates from a defect in the interferometer.

2. The method of claim 1, wherein differentially modulating the interference signal comprises independently shifting a phase in the interferometric cavity using at least two independent phase shifting components.

3. The method of claim 1, wherein the interferometric cavity includes a measurement object.

4. The method of claim 2, wherein the independent phase shifting comprises using a first of the phase shifting components to modulate a position of a first surface that defines part of the interference cavity.

5. The method of claim 4, wherein the surface is a reference surface.

6. The method of claim 4, wherein the surface is a measurement surface of a measurement object.

7. The method of claim 4, wherein the independent phase shifting comprises using a second of the phase shifting components to modulate the position of a second surface that defines another part of the interference cavity.

8. The method of claim 7, wherein the first surface comprises a measurement surface and the second surface comprises a reference surface.

9. The method of claim 4, wherein the desired interference intensity modulates at a frequency related to:

$$v_1 - v_2$$

wherein $v_1$ and $v_2$ are the modulation rates of the first surface and the second surface, respectively.

10. The method of claim 2, wherein the independent phase shifting comprises using a first of the phase shifting components to modulate a wavelength of an input beam to the interferometer.

11. The method of claim 10, wherein the interference signal phase variation due to the modulation of the wavelength is related to $$2n\frac{\partial k}{\partial t}(x_1 - x_2)$$

wherein n is a refractive index, $$k = \frac{2\pi}{\lambda}$$

wherein λ is the wavelength the input beam in the interferometer, $$\frac{\partial k}{\partial t}$$

is a wavelength scan rate, and $x_1$ and $x_2$ are positions of surfaces that define the interferometric cavity.

12. The method of claim 11, wherein the independent phase shifting further comprises using a second of the phase shifting components to modulate $x_2$.

13. The method of claim 12, wherein the interference signal phase variation due to the wavelength modulation and the position modulation is related to:

$$2n\frac{\partial k}{\partial t}(x_1 - x_2) - 2nkv_2$$

wherein $v_2$ is the rate at which $x_2$ is modulated.

14. The method of claim 13, further comprising repositioning the surface at $x_1$ to a new position at $x_1'$, and selecting at least one of $x_1'$, $$\frac{\partial k}{\partial t},$$

or $v_2$ so that $$x_1' = x_1 + kv_2\left(\frac{\partial k}{\partial t}\right)^{-1}.$$

15. The method of claim 14, wherein the one of the surfaces is a reference surface and the other of the surfaces is a surface of a measurement object.

16. The method of claim 15, wherein the measurement object is a transparent measurement object.

17. The method of claim 16, wherein a distance between the measurement object and the reference surface is at least equal to a thickness of the measurement object.

18. The method of claim 2, wherein the independent phase shifting comprises using a first of the phase shifting components to variably sample a plane-polarized component of a polarized interference beam, wherein the interference signal is derived from the polarized interference beam, and the polarized interference beam is retarded by a predetermined amount prior to being variably sampled.

19. The method of claim 18, wherein the intensity of the normalized sampled component is related to:

$$I(\theta, \varphi) = \frac{1 - \sin(2\theta - \varphi)}{2}$$

wherein θ is an orientation angle of the sampled component and φ is a phase difference between a first component and a second component of the polarized interference signal, the first component being polarized orthogonal to the second component, and wherein the polarized interference beam is retarded by a quarter wavelength.

20. The method of claim 18, wherein the independent phase shifting comprises using a second of the phase shifting components to modulate a wavelength of an input beam to the interferometer.

21. The method of claim 2, further comprising applying a phase extraction algorithm to the interference signal to determine a phase of the interference signal.

22. The method of claim 21, wherein a first sensitivity of the phase extraction algorithm occurring at the first frequency is greater than a second sensitivity of the phase extraction algorithm occurring at the second frequency.

23. The method of claim 22, further comprising estimating, from a known geometry of the interferometer, a band of frequencies in which the second interference component could occur.

24. The method of claim 23, further comprising selecting a first modulation rate of a first of the two independent phase shifting components and a second modulation rate of a second of the two independent phase shifting components, so that a first sensitivity of the phase extraction algorithm occurring at the first frequency is greater than a second sensitivity of the phase extraction algorithm occurring at a second frequency, the second frequency being within the estimated band of frequencies.

25. The method of claim 2, further comprising operating the interferometer in tandem with a second interferometer.

26. The method of claim 25 wherein the independent phase shifting comprises using a first of the phase shifting components to modulate the position of a surface in the second interferometer.

27. The method of claim 26, wherein the independent phase shifting further comprises using a second of the phase shifting components to modulate a wavelength of an input beam to the interferometer.

28. The method of claim 2, the interferometric cavity comprises a reference surface and a surface of a measurement object.

29. The method of claim 28, wherein a distance between the measurement object and the reference surface is equal to at least a thickness of the measurement object.

30. The method of claim 29, wherein the measurement object is a transparent parallel plate.

31. The method of claim 30, wherein the interferometer is a Fizeau interferometer.

32. A system for performing phase-shifting interferometry, comprising:

an interferometer for receiving a light beam to generate an interference signal;

an interference cavity of interest included in the interferometer;

a detector for recording the interference signal;

at least two phase-shifting components for differentially modulating the interference signal; and a system controller connected to the at least two phase shifting components and the detector and which during operation causes the at least two phase-shifting components to modulate a first interference component of the interference signal at a first frequency and a second interference component to modulate at a second frequency, wherein the first interference component of in the interference signal originates from the interference cavity of interest and the second interference component if the interference signal originates from a defect in the interferometer.

33. The system of claim 32, further comprising a first surface that defines part of the interference cavity of interest, and wherein during operation a first of the phase shifting components modulates a position of the first surface.

34. The system of claim 33, wherein the first surface is a reference surface.

35. The system of claim 33, wherein the first surface is a measurement surface of a measurement object.

36. The system of claim 33, further comprising a second surface that defines another part of the interference cavity of interest, wherein during operation a second of the phase shifting components modulates the position of the second surface.

37. The system of claim 36, wherein the first surface comprises a measurement surface and the second surface comprises a reference surface.

38. The system of claim 32, further comprising a light source for providing a light beam to the interferometer, wherein the light beam has a wavelength, and during operation a first of the phase shifting components modulates the wavelength of the light beam from the light source.

39. The system of claim 38, further comprising a first surface defining a part of the interference cavity of interest, wherein during operation a second of the phase shifting components modulates a position of the first surface.

40. The system of claim 39, wherein the first surface is a reference surface.

41. The system of claim 39, further comprising a second surface defining another part of the interference cavity of interest, wherein the first surface is a reference surface and the second surface is a measurement surface of a measurement object.

42. The system of claim 41, wherein the measurement object is a transparent measurement object.

43. The system of claim 42, wherein a distance between the measurement object and the reference surface is at least equal to a thickness of the measurement object.

44. The system of claim 32, further comprising a polarizer positioned in the interferometer between the detector and the interference cavity of interest;

a retarder positioned in the interferometer between the polarizer and the interference cavity of interest;

wherein the light beam is a polarized light beam and during operation a polarized interference beam is retarded by the retarder and a first of the phase shifting components rotates the polarizer to variably sample a plane-polarized component of the polarized interference beam, wherein the interference signal is derived from the polarized interference beam.

45. The system of claim 44, wherein the retarder is a quarter wave retarder.

46. The system of claim 44, further comprising a first surface that defines part of the interference cavity of interest, and wherein during operation a second of the phase shifting components modulates a position of the first surface.

47. The system of claim 46, wherein the first surface is a reference surface.

48. The system of claim 32, further comprising a second interferometer, the second interferometer positioned to operate in tandem with the interferometer.

49. The system of claim 48, wherein the second interferometer includes a surface, and during operation a first of the phase shifting components modulates a position of the first surface.

50. The system of claim 49, further comprising a light source for providing a light beam to the interferometers, wherein the light beam has a wavelength, and during operation a second of the phase shifting components modulates the wavelength of the light beam from the light source.

51. The system of claim 48 wherein the interferometer is a Fizeau interferometer.

52. The system of claim 51, wherein the second interferometer is a Mach-Zehnder interferometer.

53. The system of claim 32, wherein the interferometric cavity of interest comprises a reference surface and a surface of a measurement object.

54. The system of claim 53, wherein a distance between the measurement object and the reference surface is equal to at least a thickness of the measurement object.

55. The system of claim 54, wherein the measurement object is a transparent parallel plate.

56. The system of claim 32, wherein the interferometer is a Fizeau interferometer.

57. The system of claim 32, wherein the interferometer is a Michelson interferometer.

* * * * *

UNITED STATES PATENT AND TRADEMARK OFFICE
CERTIFICATE OF CORRECTION

PATENT NO. : 6,717,680 B1
DATED : April 6, 2004
INVENTOR(S) : Michael Kuchel and Leslie L. Deck It is certified that error appears in the above-identified patent and that said Letters Patent is hereby corrected as shown below:

Title page,
Item [75], Inventors, replace "Keplerstrasse" with -- KeplerstraBe --
Item [56], References Cited, OTHER PUBLICATIONS, "Hariharan" reference, replace "Apppl." with -- Appl. --

Column 18,
Line 60, delete "in"
Line 62, replace "if" with -- of --

Signed and Sealed this

Fifth Day of October, 2004

JON W. DUDAS
*Director of the United States Patent and Trademark Office*

UNITED STATES PATENT AND TRADEMARK OFFICE
CERTIFICATE OF CORRECTION

PATENT NO. : 6,717,680 B1  
APPLICATION NO. : 10/144527  
DATED : April 6, 2004  
INVENTOR(S) : Michael Kuchel and Leslie L. Deck It is certified that error appears in the above-identified patent and that said Letters Patent is hereby corrected as shown below:

On the title page: Item [73] Assignee insert --Zygo Corporation, Middlefield, CT (US)--.

Signed and Sealed this

Seventeenth Day of October, 2006

JON W. DUDAS  
*Director of the United States Patent and Trademark Office*